United States Patent
Matsumoto

(10) Patent No.: US 8,760,733 B2
(45) Date of Patent: Jun. 24, 2014

(54) IMAGE READING APPARATUS AND IMAGE FORMING APPARATUS

(75) Inventor: Akira Matsumoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 13/568,770

(22) Filed: Aug. 7, 2012

(65) Prior Publication Data

US 2013/0050780 A1 Feb. 28, 2013

(30) Foreign Application Priority Data

Aug. 23, 2011 (JP) ................................. 2011-181641

(51) Int. Cl.
*H04N 1/04* (2006.01)

(52) U.S. Cl.
USPC ........... 358/475; 358/474; 358/498; 399/110; 271/213

(58) Field of Classification Search
CPC ............ H04N 9/3155; H04N 49/3164; H04N 1/0057; H04N 1/02865; H04N 2201/0081
USPC ......... 358/474, 475, 509, 498, 497, 496, 403, 358/442; 399/110, 111; 271/213, 221
See application file for complete search history.

(56) References Cited

U.S. PATENT DOCUMENTS

| | | | | |
|---|---|---|---|---|
| 5,915,691 | A * | 6/1999 | Deguchi et al. | 271/265.01 |
| 6,088,121 | A * | 7/2000 | Baumann | 358/1.18 |
| 6,252,684 | B1 * | 6/2001 | Lin | 358/498 |
| 6,516,170 | B2 * | 2/2003 | Tsukamoto et al. | 399/182 |
| 7,518,703 | B2 * | 4/2009 | Van De Kerkhof et al. | 355/53 |
| 8,194,255 | B2 * | 6/2012 | Andoh et al. | 358/1.1 |
| 8,243,347 | B2 * | 8/2012 | Okada | 358/474 |
| 8,274,664 | B2 * | 9/2012 | Tamura | 358/1.1 |
| 8,274,673 | B2 * | 9/2012 | Okumura et al. | 358/1.13 |
| 8,289,589 | B2 * | 10/2012 | Matsushima | 358/498 |
| 8,427,720 | B2 * | 4/2013 | Kobayashi | 358/498 |
| 8,508,819 | B2 * | 8/2013 | Asada et al. | 358/498 |
| 8,520,271 | B2 * | 8/2013 | Nishio | 358/475 |
| 2001/0050783 | A1 * | 12/2001 | Sato et al. | 358/1.15 |

FOREIGN PATENT DOCUMENTS

JP 2008-010902 A 1/2008

* cited by examiner

*Primary Examiner* — Negussie Worku

(74) *Attorney, Agent, or Firm* — Fitzpatrick, Cella, Harper & Scinto

(57) ABSTRACT

An image reading apparatus includes a fed original placing portion on which an original is placed, wherein the fed original placing portion is configured to be rotated; an feeding portion that feeds the original placed on the fed original placing portion; an image reading portion that reads an image of the original fed by the feeding portion; a discharging portion, disposed below the fed original placing portion, onto which the original with the image read by the image reading portion is discharged; an irradiation portion that irradiates the discharging portion with light; and a stopping unit that stops the irradiation of the light by the irradiation portion according to a rotation of the fed original placing portion.

29 Claims, 7 Drawing Sheets

IMAGE READING APPARATUS AND IMAGE FORMING APPARATUS

BACKGROUND OF THE INVENTION

1. Field of the Invention

The present invention relates to an image forming apparatus and an image reading apparatus including an irradiation portion irradiating a discharged original placing portion with light.

2. Description of the Related Art

Hitherto, an image reading apparatus installed in an image forming apparatus such as a copying machine, a facsimile apparatus, or a complex apparatus includes an auto document feeder (ADF). The ADF feeds an original from an original placing portion, and conveys and discharges the original to an original discharge portion installed below the original placing portion via an original reading portion that reads an image of the original.

In the image reading apparatus, since the ADF conveys the original from the original placing portion to the original discharge portion, a user needs to remove the original from the original discharge portion. However, a problem may arise in that the user may not be aware of the discharged original and the user may forget to take the original.

Accordingly, in order to prevent the user from forgetting to take the original, a configuration has been disclosed in Japanese Patent Laid-Open No. 2008-10902. In Japanese Patent Laid-Open No. 2008-10902, the original placing portion includes a see-through portion capable of seeing through the original discharge portion. Further, an original detecting portion that detects that an original is discharged to the original discharge portion is provided and an illuminator that irradiates the original discharge portion is also provided.

When the illuminator irradiates the original discharge portion with light, the user is prompted to see the original discharge portion. Thus, it is possible to prevent the user from forgetting to take the original discharged to the original discharge portion. Specifically, when the original is placed on the original discharge portion for a given time, the illuminator irradiates the original discharge portion with the light. Further, in order to save power, the irradiation is configured to end after the original discharge portion is irradiated with the light and a predetermined time passes.

When the user is aware of the original placed on the original discharge portion by irradiating the original discharge portion with the light from the illuminator, the user rotates the original placing portion to open the upper side of the original discharge portion and removes the original from the original discharge portion. However, when the user rotates the original placing portion during the irradiation of the light from the illuminator while the user removes the original from the original discharge portion, the illuminator emits the light.

The image reading apparatus including the ADF is capable of reading images of a plurality of originals (hereinafter, referred to as skimming reading) by the ADF and also setting a heavy original such as a book on an original base plate installed below the ADF and reading an image of the heavy original (hereinafter, referred to as fixing reading). Therefore, even when the user is aware of the presence of an original placed on the original discharge portion after the skimming reading, the user sometimes performs the fixing reading continuously before the user removes the original. In this case, when the user sets the heavy original on the original base plate and rotates the ADF during the irradiation of the light from the illuminator, the illuminator emits the light. Above described, the useless illumination of the light by the illuminator is performed.

SUMMARY OF THE INVENTION

It is desirable to prevent the useless illumination of the light.

According to an aspect of the invention, there is provided an image reading apparatus comprising: a fed original placing portion on which an original is placed, wherein the fed original placing portion is configured to be rotated; an feeding portion that feeds the original placed on the fed original placing portion; an image reading portion that reads an image of the original fed by the feeding portion; a discharging portion, disposed below the fed original placing portion, onto which the original with the image read by the image reading portion is discharged; an irradiation portion that irradiates the discharging portion with light; and a stopping unit that stops the irradiation of the light by the irradiation portion according to a rotation of the fed original placing portion.

According to another aspect of the invention, there is provided an image reading apparatus comprising: an apparatus body that includes an image reading portion reading an image of an original; a feeding unit that includes a fed original placing portion on which the original is placed, an feeding portion feeding the original placed on the fed original placing portion while causing the image reading portion to read the image of the original, a discharging portion onto which the original with the image read by the image reading portion is discharged, and an irradiation portion irradiating the discharging portion with light, wherein feeding unit is configured to be rotatable on the apparatus body; and a stopping unit that stops the irradiation of the light by the irradiation portion according to a rotation of the feeding unit.

Further features of the present invention will become apparent from the following description of exemplary embodiments with reference to the attached drawings.

DESCRIPTION OF THE EMBODIMENTS

Hereinafter, a preferred embodiment of the invention will be described with reference to the drawings. Here, the sizes, materials, shapes, relative arrangements, and the like of constituent elements described in the embodiment to be described below are appropriately modified depending on the configurations of apparatuses or various conditions according to the invention. Accordingly, the scope of the invention is not limited thereto, unless specifically described otherwise.

An image reading apparatus and an image forming apparatus according to the embodiment of the invention will be described with reference to FIGS. 1 to 4. Here, a copying machine A will be described as an example of the image forming apparatus including an image reading apparatus.

Figure 1:
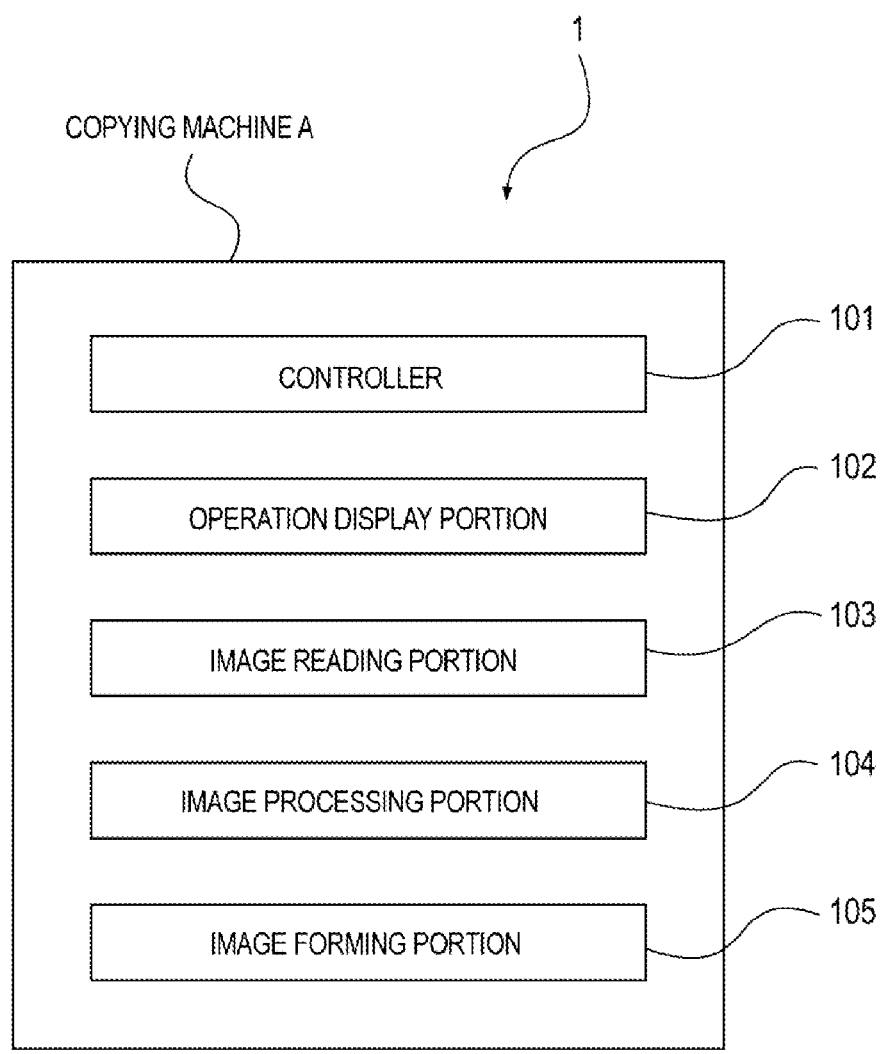
FIG. 1 is a diagram illustrating the overall configuration of a copying machine A according to an embodiment of the invention.
Figure 2A:
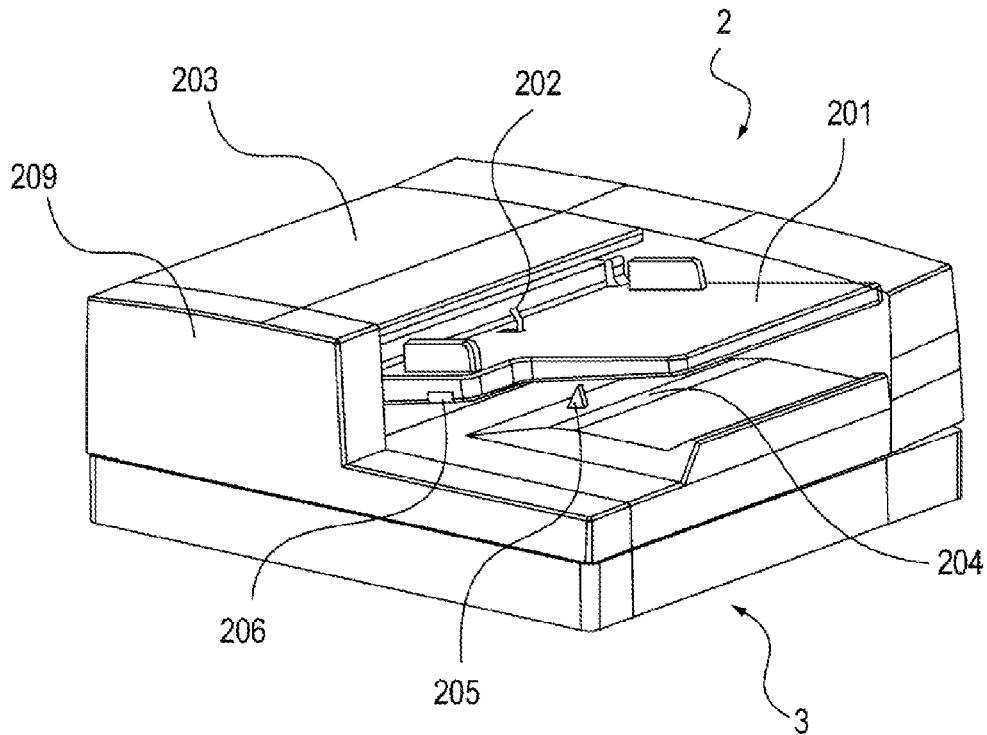
FIG. 2A is a diagram illustrating the configurations of a document feeder and an image reading apparatus according to the embodiment of the invention and FIG. 2B is a diagram illustrating a process of rotating a fed original placing portion of FIG. 2A.
Figure 2B:
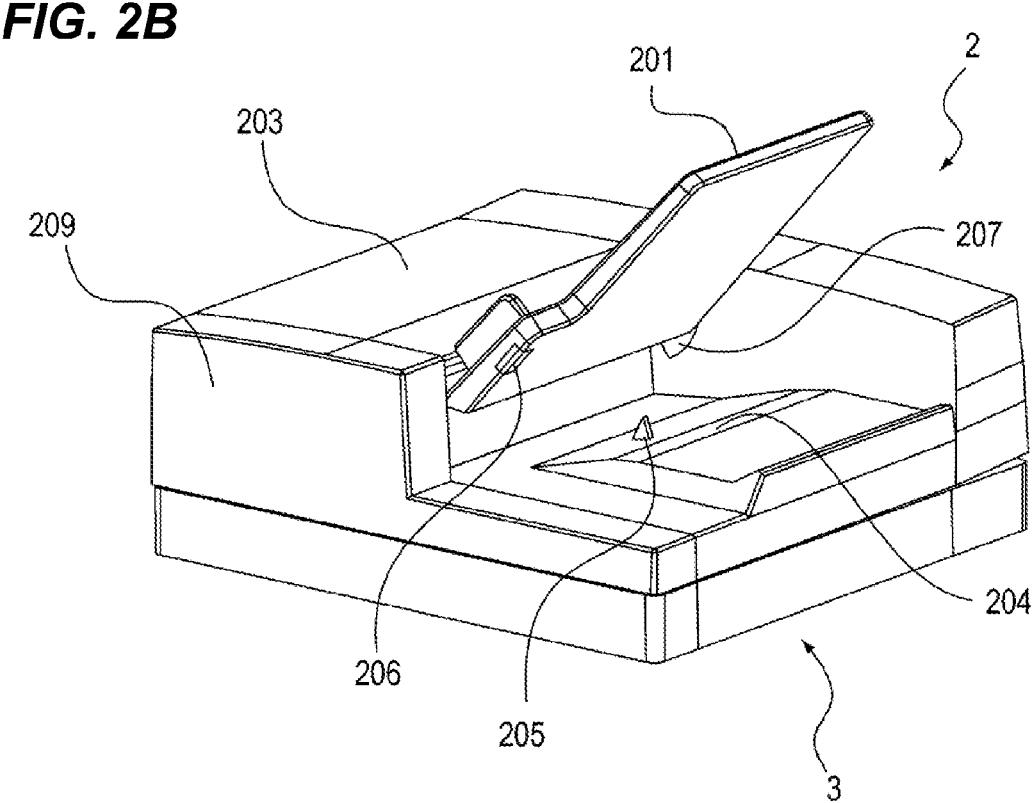
Figure 3:
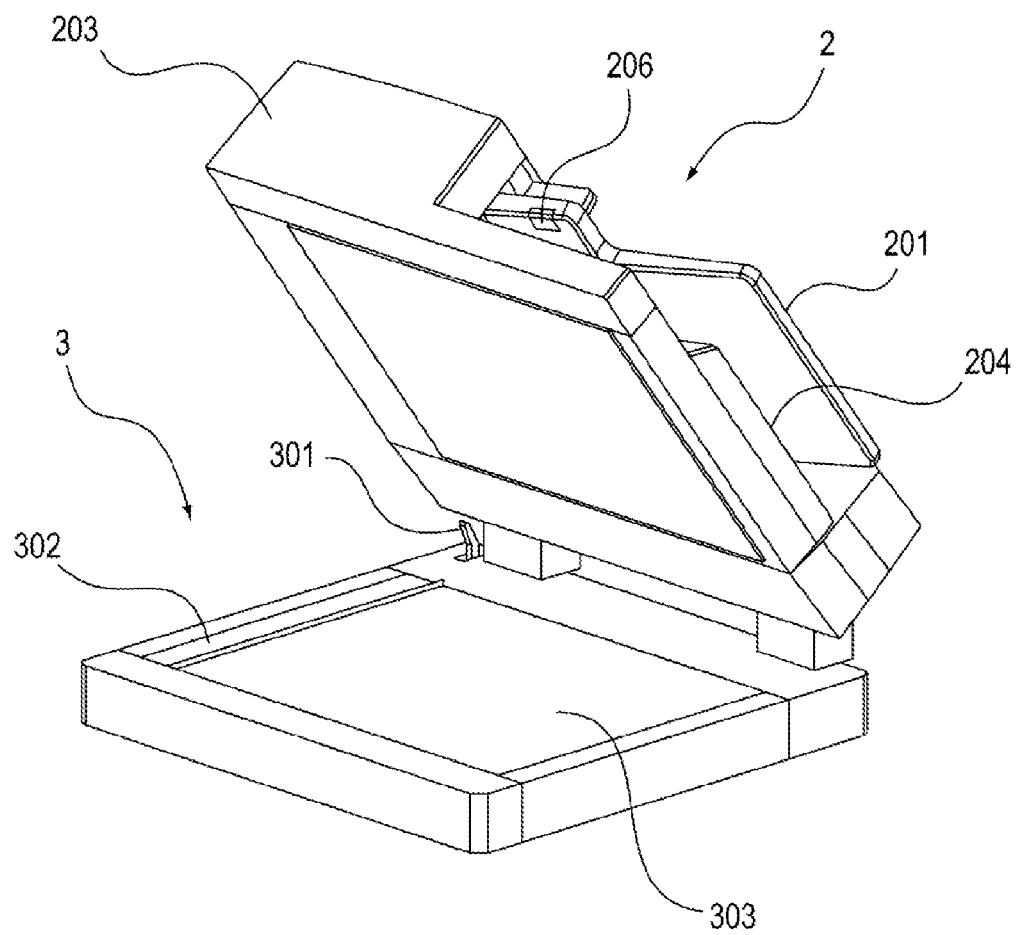
FIG. 3 is a diagram illustrating a process of rotating the document feeder of FIG. 2A.
Figure 4:
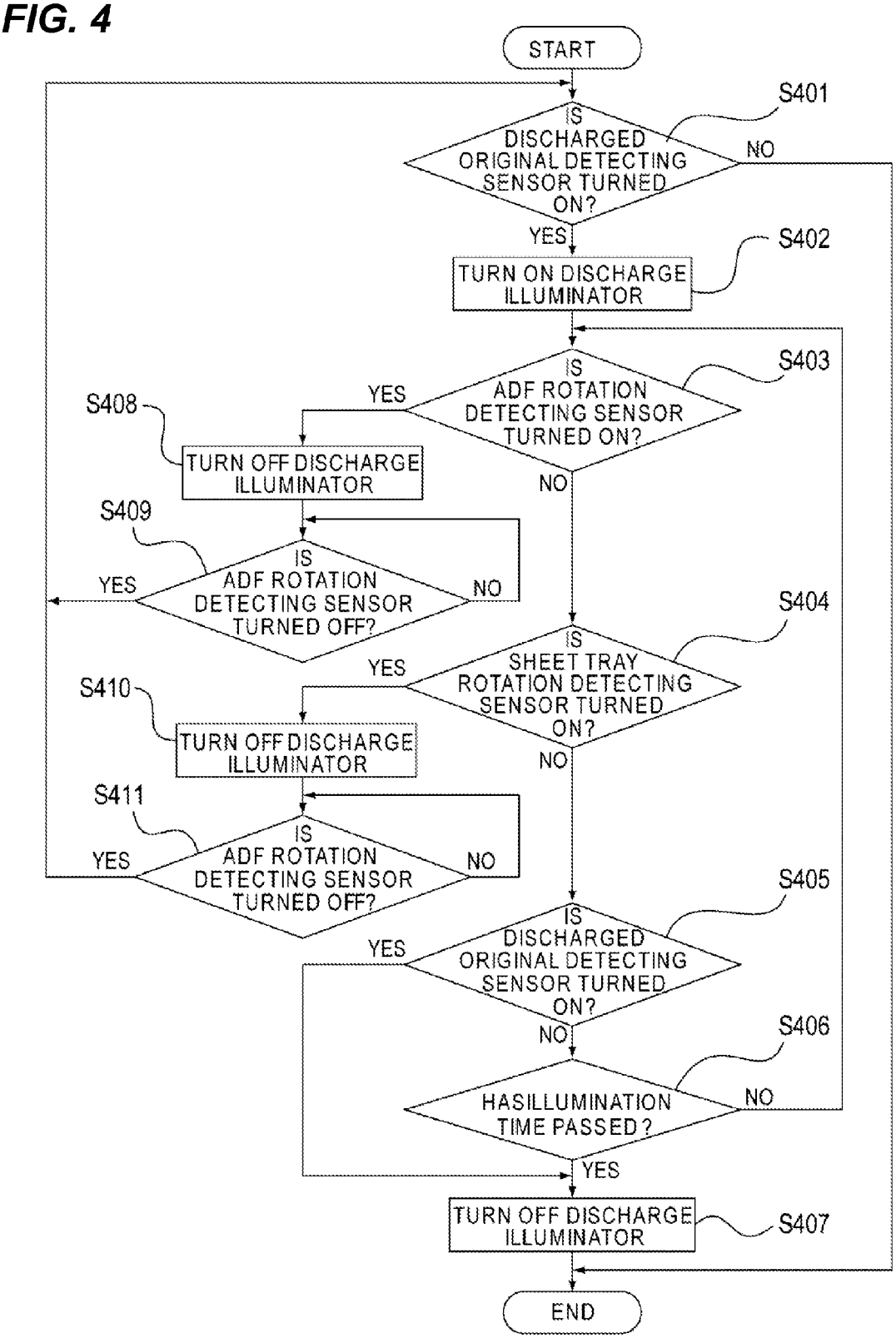
FIG. 4 is a flowchart illustrating a process of an irradiation portion according to the embodiment of the invention.

FIG. 1 is a schematic diagram illustrating the overall configuration of the copying machine A according to the embodiment of the invention. FIGS. 2A and 2B are diagrams illustrating the configuration of an image reading apparatus installed in the copying machine A. FIG. 2A is a perspective view illustrating the image reading apparatus and FIG. 2B is a perspective view illustrating a case in which a sheet tray of the imaging reading apparatus is rotated. FIG. 3 is a perspective view illustrating a case in which an ADF of the image reading apparatus is rotated. FIG. 4 is a flowchart illustrating a process of an irradiation portion installed in the image reading apparatus.

First, the overall configuration of the copying machine A according to the embodiment of the invention will be described with reference to FIG. 1. As shown in FIG. 1, the copying machine A includes an operation display portion 102, an image reading portion 103, an image processing portion 104, an image forming portion 105, a controller 101, and the like.

The operation display portion 102 is a liquid crystal display including a touch panel that displays various kinds of information when a user performs various operations such as a magnification ratio changing operation, a density changing operation, and the like on a read image. The image reading portion 103 is an image reading apparatus that reads an image of an original. The image processing portion 104 performs a density correcting process or the like on the image read by the image reading portion 103. The image forming portion 105 transfers and fixes the image to a recording medium such as a record sheet using toner based on image data subjected to image processing by the image processing portion 104. The controller 101 includes control portions such as a CPU, a RAM, and a ROM and controls the copying machine A.

Next, the configuration of the image reading portion 103 which is an image reading device will be described with reference to FIGS. 2A, 2B, and 3. The image reading portion 103 includes an ADF 2 that is a document feeder conveying the original in order to perform the skimming reading on a plurality of originals, and the image reading apparatus 3 that reads an image of an original conveyed by the ADF 2 and an image of an original set on an original base plate glass 303.

The ADF 2 includes a sheet tray 201, a fed original detecting sensor 202, an auto original feeding portion 203, a discharge tray 204, a discharged original detecting sensor 205, a discharge illuminator 206, and a sheet tray rotation detecting sensor 207.

The sheet tray 201 is a fed original placing portion on which the fed original is placed. The sheet tray 201 is rotatably supported on the flame 209 of the ADF 2. The fed original detecting sensor 202 is a fed original detecting portion that detects that the original is placed on the sheet tray 201. The auto original feeding portion 203 conveys the original placed on the sheet tray 201 by a roller, a belt, or the like. The discharge tray 204 is a discharged original placing portion on which the original discharged from the auto original feeding portion 203 is placed. The discharged original detecting sensor 205 is a discharged original detecting portion that detects that the original is placed in the discharge tray 204. The discharge illuminator 206 is an irradiation portion that irradiates the original placed on the discharge tray 204 with light. The discharge illuminator 206 is configured by, for example, an electric lamp, a fluorescent lamp, a luminescent diode, or the like. The discharge illuminator 206 is installed in the sheet tray 201. The sheet tray rotation detecting sensor 207 is a fed original placing portion rotation detecting portion that detects a process of rotating the sheet tray 201.

As shown in FIG. 3, the ADF 2 that can be rotated (opened and closed) is equipped on the image reading apparatus 3. A sheet-shaped original is conveyed by the auto original feeding portion 203 and an image is read at a position (reading position) of a skimming reading glass 302 by the image reading portion stopped at the position of the skimming reading glass 302. On the other hand, a heavy original such as a book is set on the original base plate glass 303 and an image is read along the original on the original base plate glass 303 by the moved (scanned) image reading portion.

The image reading apparatus 3 includes an ADF rotation detecting sensor 301 as a document feeder rotation detecting portion that detects the process of rotating the ADF 2. The process of rotating and opening the ADF 2 is detected by the ADF rotation detecting sensor 301 of the image reading apparatus 3. That is, the process of rotating and opening the ADF 2 in a direction in which the ADF 2 is distant from the reading position in the apparatus body of the image reading apparatus 3 is detected by the ADF rotation detecting sensor 301.

The ADF 2 feeds the original set on the sheet tray 201 into the inside of the ADF 2 one by one. The ADF 2 conveys the original through the reading position (the skimming reading glass 302) of the image reading apparatus 3 and discharges the original to the discharge tray 204. When the original is conveyed by the ADF 2, an image of the original is read by a reading sensor (image reading portion) included in the image reading apparatus 3.

As shown in FIG. 2B, the sheet tray 201 is installed to be rotatable in an upward direction of the original placing surface of the discharge tray 204. That is, the original discharged to the discharge tray 204 can easily be removed by rotating and opening the sheet tray 201 (in the direction in which the sheet tray 201 is distant from the original placing surface of the discharge tray 204).

For example, when the discharged original detecting sensor 205 of the ADF 2 detects the original discharged on the discharge tray 204, as in the flowchart of FIG. 4, the discharge illuminator 206 irradiates the discharge tray 204 with light and prompts a user to see the original placed on the discharge tray 204 to prevent the user from forgetting to take the original placed on the discharge tray 204. The controller 101 controls the lighting on and off of the discharge illuminator 206 based on signals from sensors such as the discharged original detecting sensor 205, the ADF rotation detecting sensor 301, and the sheet tray rotation detecting sensor 207. The controller 101 constitutes the stopping unit that stops the irradiation of the light by the illuminator 206 in this embodiment. Hereinafter, the controlling performed by the controller 101 over the discharge illuminator 206 will be described with reference to the flowchart of FIG. 4.

When the original is discharged on the discharge tray 204 and the discharged original detecting sensor 205 determines that the original is preset on the discharge tray 204, the discharge illuminator 206 irradiates the discharge tray 204 with light, as in step S401 and step S402. Conversely, when a user removes the original from the discharge tray 204 and the discharged original detecting sensor 205 determines that the original is not present on the discharge tray 204, as in step S405 and step S407, the discharge illuminator 206 is turned off and stops the irradiation of the light.

Next, the ADF rotation detecting sensor 301 detects whether the ADF 2 is rotated, while the discharge illuminator 206 is turned on, as in step S403. When the ADF rotation detecting sensor 301 determines that the ADF 2 is rotated, the discharge illuminator 206 is turned off and stops the irradiation of the light (S408). Thus, the user causes the ADF 2 to read images of the plurality of originals, and then sets a heavy original such as a book on the original base plate glass 303 to perform the image reading, before removing the original discharged on the discharge tray 204. Therefore, even when the ADF 2 is rotated, the user can be prevented from being directly irradiated with the light with which the discharge illuminator 206 irradiates the discharge tray 204. Then, if ADF 2 is closed (Yes of S409), the discharged original detecting sensor 205 detects whether the original is preset on the discharge tray 204 or not (S401). If ADF 2 is closed and the discharged original detecting sensor 205 detects the original on the discharge tray, the discharge illuminator 206 irradiates the discharge tray 204 with light as in step S402. Here, when the ADF 2 is not rotated, the discharge illuminator 206 continues irradiating the discharge tray 204 with the light.

Next, the sheet tray rotation detecting sensor 207 detects whether the sheet tray 201 is rotated, as in step S404. When the sheet tray rotation detecting sensor 207 determines that the sheet tray 201 is rotated, the discharge illuminator 206 is turned off and stops the irradiation of the light (S410). Thus, the user operates the ADF 2 to read an image of the original, and then removes the original discharged on the discharge tray 204. Therefore, when the sheet tray 201 is rotated, the user can be prevented from being directly irradiated with the light with which the discharge illuminator 206 irradiates the discharge tray 204. Then, if the sheet tray 201 is closed (Yes of S411), the discharged original detecting sensor 205 detects whether the original is preset on the discharge tray 204 or not (S401). If the sheet tray 201 is closed and the discharged original detecting sensor 205 detects the original on the discharge tray, the discharge illuminator 206 irradiates the discharge tray 204 with light as in step S402. Here, when the sheet tray 201 is not rotated, the discharge illuminator 206 continues irradiating the discharge tray 204 with the light.

When the original on the discharge tray 204 is not removed and both the sheet tray 201 and the ADF 2 are not rotated, the following process is performed to save energy. That is, the discharged original detecting sensor 205 determines that the original is present on the discharge tray 204, a predetermined time (for example, 10 seconds) passes, as in step S406, the discharge illuminator 206 is turned off and stops the irradiation of the light. Thus, the power consumption can be reduced.

In the above-described embodiment, the discharge illuminator 206 is turned off according to the rotating of the sheet tray 201 or the ADF 2. However, the discharge illuminator 206 may stop the irradiation of the light by providing a shutter 501 as a shielding portion that blocks the light from the discharge illuminator 206 (a light source), associating the shutter 501 with the process of rotating the sheet tray 201 or the ADF 2, and causing the shutter 501 to block the light from the discharge illuminator 206.

Figure 5A:
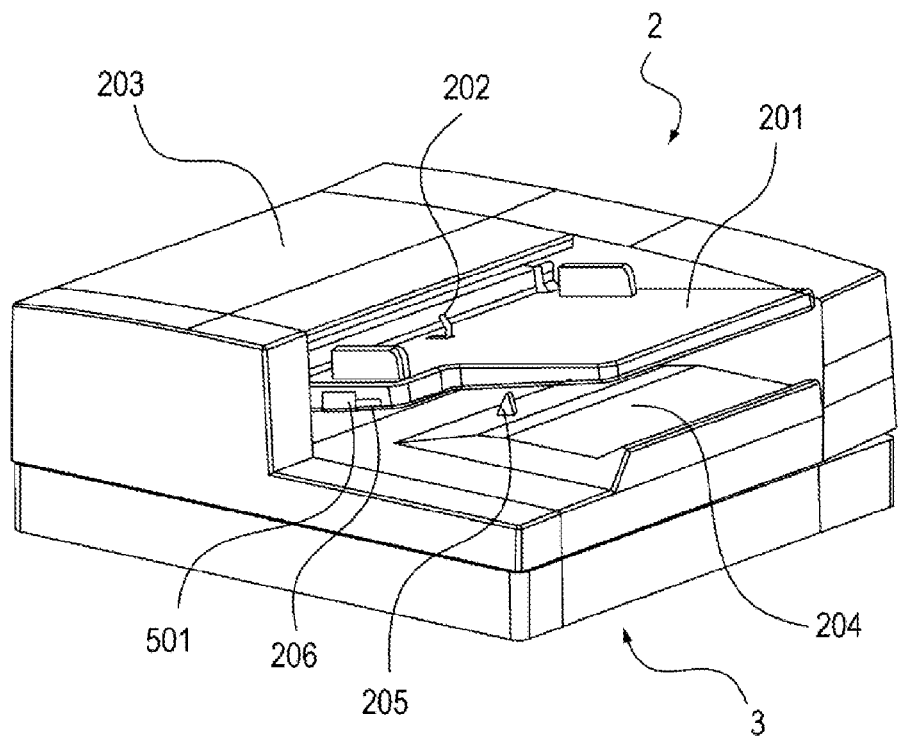
FIG. 5A is a diagram illustrating another configuration of the document feeder and the image reading apparatus according to the embodiment of the invention and FIG. 5B is a diagram illustrating a case in which a shielding portion in FIG. 5A operates.
Figure 5B:
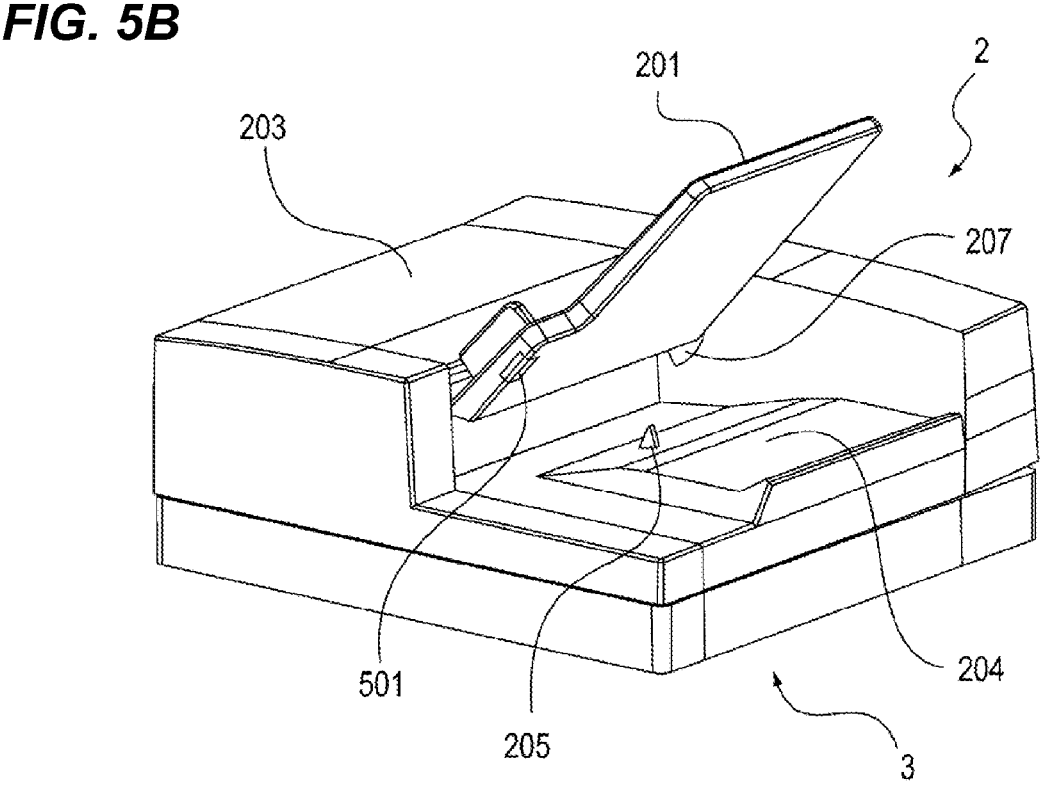
Figure 6:
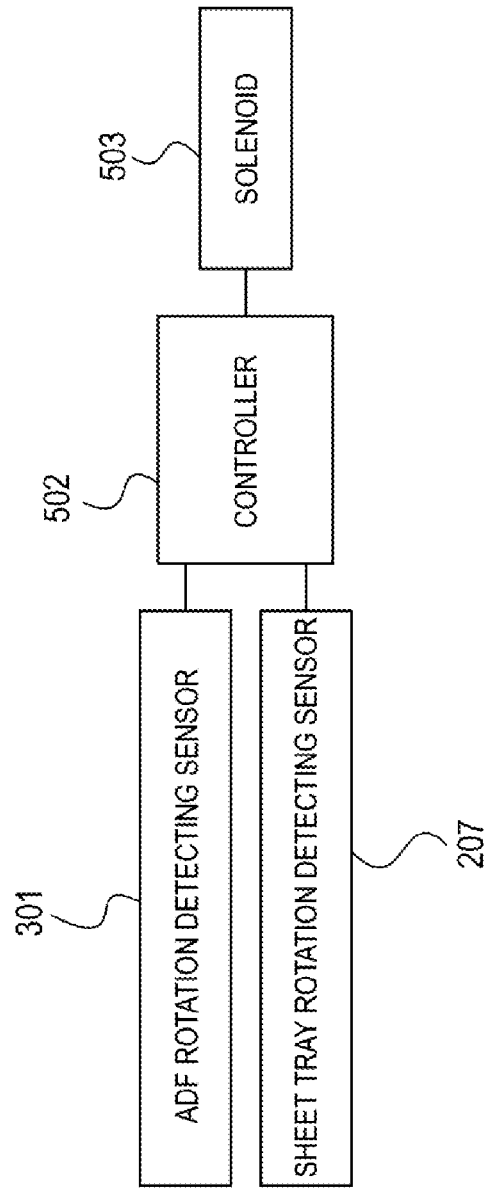
FIG. 6 is a control block diagram illustrating a configuration in which light is shielded by a shutter.

Specifically, as shown in FIGS. 5A and 5B, the shutter 501 is installed in the vicinity of the discharge illuminator 206 and operates in association with the process of rotating the sheet tray 201 or the ADF 2. The shutter 501 constitutes the stopping unit that stops the irradiation of the light by the illuminator 206 in this embodiment. When the user rotates the sheet tray 201 (or the ADF 2) from the closing position shown in FIG. 5A to the opening position shown in FIG. 5B, the shutter 501 is moved to a position, at which the light from the discharge illuminator 206 is blocked, in association with the rotating process to block the light from the discharge illuminator 206. Thus, the user can be prevented from being directly irradiated with the light from the discharge illuminator 206. In order to move the shutter 501, a solenoid 503 shown in the control block of FIG. 6 is used.

When the ADF rotation detecting sensor 301 detects that the ADF 2 is opened, the controller 502 controls a conducting state of the solenoid 503 such that the shutter 501 is located at the position at which the light from the discharge illuminator 206 is blocked. When the ADF rotation detecting sensor 301 detects that the ADF 2 is closed, the controller 502 controls the conducting state of the solenoid 503 such that the shutter 501 is located at a position at which the light from the discharge illuminator 206 is not blocked. When the sheet tray rotation detecting sensor 207 detects that the sheet tray 201 is opened, the controller 502 controls the conducting state of the solenoid 503 such that the shutter 501 is located at the position at which the light from the discharge illuminator 206 is blocked. When the sheet tray rotation detecting sensor 207 detects that the sheet tray 201 is closed, the controller 502 controls the conducting state of the solenoid 503 such that the shutter 501 is located at a position at which the light from the discharge illuminator 206 is not blocked.

Figure 7A:
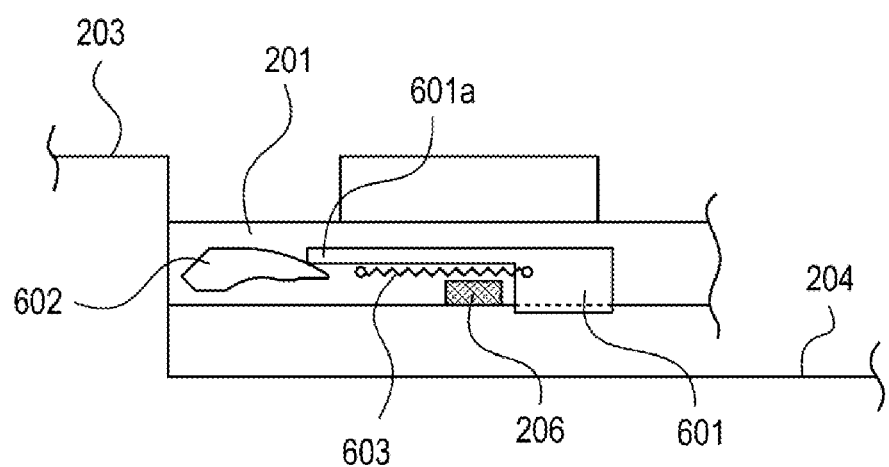
FIGS. 7A and 7B are diagrams illustrating a configuration in which light is shielded by a shutter.
Figure 7B:
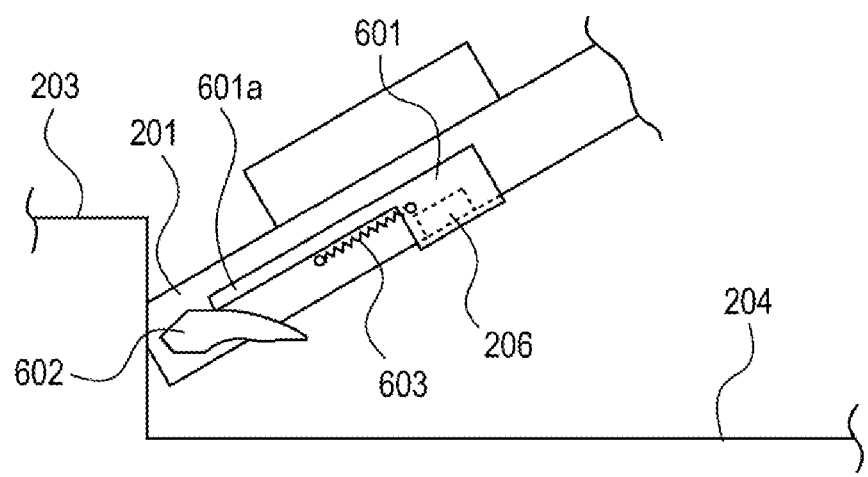

In the configuration in which the light from the discharge illuminator 206 is blocked using the shutter, as exemplified in FIGS. 7A and 7B, an associating mechanism may be provided to mechanically associate the shutter with the process of rotating the sheet tray 201. In FIGS. 7A and 7B, a cam 602 is installed in the ADF 2 and moves a light-shielding plate 601 which is a shutter. The light-shielding plate 601 is installed in the sheet tray 201 so as to be moved in a sliding manner. The light-shielding plate 601 is urged by a tension spring 603 such that the cam 602 collides against the left side of the drawing, that is, an end portion 601a of the light-shielding plate 601. FIG. 7A shows the closed state of the sheet tray 201. FIG. 7B shows the opened state of the sheet tray 201. When the sheet tray 201 is opened from the position shown in FIG. 7A to the position shown in FIG. 7B, the urging force of the tension spring 603 causes the light-shielding plate 601 to be moved to the position, at which the light from the discharge illuminator 206 is blocked, by the operation of the cam 602.

In the above-described embodiment, the configuration has been exemplified in which the document feeder (the ADF 2) serving as the image reading apparatus is rotatable with respect to the apparatus body of the image reading apparatus, but the invention is not limited thereto. The invention can be effectively embodied even when an image reading apparatus having a configuration in which only the skimming reading is performed is provided.

In the above-described embodiment, the copying machine is exemplified as the image forming apparatus, but the invention is not limited thereto. For example, another image forming apparatus such as a facsimile apparatus or another image forming apparatus such as a complex apparatus combining such functions may be provided. The same advantages can be obtained by applying such image forming apparatuses to the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2011-181641, filed Aug. 23, 2011, which is hereby incorporated by reference herein in its entirety.

What is claimed is:

1. An image reading apparatus comprising:
a movable sheet placing portion constructed to receive a sheet;
a feeding portion constructed to feed the sheet from the sheet placing portion;
an image reading portion constructed to read the sheet fed by the feeding portion;
a discharging portion, disposed below the sheet placing portion, onto which the sheet read by the image reading portion is discharged;
an illuminating portion constructed to illuminate the discharging portion; and
a restricting portion constructed to restrict illumination by the illuminating portion according to a movement of the sheet placing portion.

2. The image reading apparatus according to claim 1, further comprising:
a controller configured to control the illuminating portion,
wherein the restricting portion includes a detecting portion constructed to detect the movement of the sheet placing portion, and
the controller is configured to control the illuminating portion based on a signal from the detecting portion,
wherein while the illuminating portion illuminates the discharging portion, the controller controls the illuminating portion such that the illuminating portion is turned off if the detecting portion detects movement of the sheet placing portion.

3. The image reading apparatus according to claim 2, further comprising:
a sensor constructed to detect the sheet on the discharging portion,
wherein the controller is further configured to control the illuminating portion such that the illuminating portion is turned on if the detecting portion detects a closure of the sheet placing portion and the sensor detects the sheet on the discharging portion.

4. The image reading apparatus according to claim 2, further comprising:
a sensor portion constructed to detect the sheet on the discharging portion,
wherein the controller is further configured to control the illuminating portion such that the illuminating portion is turned off if the sensor detects that the sheet is removed from the discharging portion.

5. The image reading apparatus according to claim 1,
wherein the restricting portion includes a shielding portion that is movable to a position at which the shielding portion blocks light from the illuminating portion,
wherein while the illuminating portion illuminates the discharging portion, the shielding portion is moved to the position at which the shielding portion blocks the light from the illumination portion according to the movement of the sheet placing portion.

6. The image reading apparatus according to claim 1, wherein the illuminating portion is disposed on the sheet placing portion.

7. The image reading apparatus according to claim 6, wherein the illuminating portion is disposed at an edge of the sheet placing portion.

8. The image reading apparatus according to claim 1, wherein the sheet placing portion is rotatable.

9. The image reading apparatus according to claim 8, wherein a rotation axis of the sheet placing portion is located at a downstream side of the sheet placing portion in a sheet conveying direction.

10. An image reading apparatus comprising:
an apparatus body that includes an image reading portion constructed to read a sheet;
a feeding unit that includes:
a sheet placing portion constructed to receive the sheet,
a feeding portion constructed to feed the sheet from the sheet placing portion, while the image reading portion reads the sheet,
a discharging portion onto which the sheet read by the image reading portion is discharged, and
an illuminating portion constructed to illuminate the discharging portion,
wherein the feeding unit is configured to be movable on the apparatus body; and
a restricting portion constructed to restrict illumination by the illuminating portion according to a movement of the feeding unit.

11. The image reading apparatus according to claim 10, further comprising:
a controller configured to control the illuminating portion,
wherein the restricting portion includes a movement detecting portion constructed to detect the movement of the feeding unit, and
wherein the controller is configured to control the illuminating portion based on a signal from the movement detecting portion,
wherein while the illuminating portion illuminates the discharging portion, the controller controls the illuminating portion such that the illuminating portion is turned off if the movement detecting portion detects movement of the feeding unit.

12. The image reading apparatus according to claim 11, further comprising:
a sensor constructed to detect the sheet on the discharging portion,
wherein the controller is further configured to control the illuminating portion such that the illuminating portion is turned on if the movement detecting portion detects a closure of the sheet placing portion and the sensor detects the sheet on the discharging portion.

13. The image reading apparatus according to claim 11, further comprising:
a sensor portion configured to detect the sheet on the discharging portion,
wherein the controller is further configured to control the illuminating portion such that the illuminating portion is turned off if the sensor portion detects that the sheet is removed from the discharging portion.

14. The image forming apparatus according to claim 10,
wherein the restricting portion includes a shielding portion that is movable to a position at which the shielding portion blocks light from the illuminating portion and,
wherein while the illuminating portion illuminates the discharging portion, the shielding portion is moved to the position at which the shielding portion blocks the light from the illuminating portion according to the movement of the feeding unit.

15. The image reading apparatus according to claim 10, wherein the feeding unit is rotatable.

16. The image reading apparatus according to claim 15, wherein the illuminating portion is disposed at an opposite side of a rotational axis of the feeding unit.

17. An image reading apparatus comprising:

a movable sheet placing portion constructed to receive a sheet;

a feeding portion constructed to feed the sheet placed on the sheet placing portion;

an image reading portion constructed to read the sheet fed by the feeding portion;

a discharging portion, disposed below the sheet placing portion, onto which the sheet read by the image reading portion is discharged;

an illuminating portion constructed to illuminate the discharging portion;

a detecting portion constructed to detect the movement of the sheet placing portion; and a controller configured to control the illuminating portion such that illumination by the illuminating portion is restricted if the detecting portion detects the movement of the sheet placing portion.

18. The image reading apparatus according to claim 17, wherein the controller is further configured to control the illuminating portion such that the illuminating portion is turned off if the detecting portion detects the movement of the sheet placing portion.

19. The image reading apparatus according to claim 17, wherein the sheet placing portion is rotatable.

20. The image reading apparatus according to claim 19, wherein a rotation axis of the sheet placing portion is located at a downstream side of the sheet placing portion in a sheet conveying direction.

21. The image reading apparatus according to claim 17, wherein the illuminating portion is disposed on the sheet placing portion.

22. The image reading apparatus according to claim 21, wherein the illuminating portion is disposed at an edge of the sheet placing portion.

23. The image reading apparatus according to claim 17, further comprising:

a sensor portion constructed to detect the sheet on the discharging portion, wherein the controller is further configured to control the illuminating portion such that the illuminating portion is turned off if the sensor detects that the sheet is removed from the discharging portion.

24. An image reading apparatus comprising:

a movable sheet placing portion constructed to receive a sheet;

a feeding portion constructed to feed the sheet placed on the sheet placing portion;

an image reading portion constructed to read the sheet fed by the feeding portion;

a discharging portion, disposed below the sheet placing portion, onto which the sheet read by the image reading portion is discharged;

an illuminating portion constructed to illuminate the discharging portion; and a shielding portion constructed to be movable to a position, at which the shielding portion blocks a light from the illuminating portion, according to the movement of the sheet placing portion.

25. The image reading apparatus according to claim 24, wherein the sheet placing portion is rotatable.

26. The image reading apparatus according to claim 25, wherein a rotation axis of the sheet placing portion is located at a downstream side of the sheet placing portion in a sheet conveying direction.

27. The image reading apparatus according to claim 24, wherein the illuminating portion is disposed on the sheet placing portion.

28. The image reading apparatus according to claim 27, wherein the illuminating portion is disposed at an edge of the sheet placing portion.

29. The image reading apparatus according to claim 24, further comprising:

a sensor portion constructed to detect the sheet on the discharging portion; and a controller configured to control the illuminating portion such that the illuminating portion is turned off if the sensor detects that the sheet is removed from the discharging portion.

* * * * *